April 5, 1966 A. C. BARTON 3,244,982

ELECTRONIC APPARATUS INCORPORATING BOTH TUBES AND TRANSISTORS

Filed March 16, 1962 2 Sheets-Sheet 1

Inventor
A. C. Barton
By Holcombe Wetherill & Brisebois
Attorneys

Inventor
A. C. Barton
By Holcombe Wetherill & Brisebois
Attorneys 3,244,982
ELECTRONIC APPARATUS INCORPORATING BOTH TUBES AND TRANSISTORS Arthur C. Barton, Cambridge, England, assignor to Pye Limited, Cambridge, England, a British company Filed Mar. 16, 1962, Ser. No. 180,148
Claims priority, application Great Britain, Mar. 23, 1961, 10,665/61, 10,666/61
3 Claims. (Cl. 325—410)

The present invention relates to electronic apparatus incorporating both tubes and one or more transistors.

According to one aspect of the present invention, the power supply to at least one transistor is derived from a load connected in series with one of the tubes.

In one form of the invention, a tube has a cathode load comprising two series connected resistors, one of which is dimensioned to provide the correct grid bias for the tube and the other of which is dimensioned to provide the correct power supply for the transistor or transistors. In another form of the invention the power supply to one or more transistors may be derived from a resistor network connected in the anode circuit of the tube. Alternatively the power supply of the transistor circuit may be stabilised by deriving the power supply from across a zener diode connected in series with the tube, either in the anode circuit or the cathode circuit. If necessary, in order to provide a sufficient current to bias the zener diode well over the knee of its characteristic it may be connected in series with more than one tube. The invention may be particularly employed in television receivers employing both tube and transistor circuits.

It is also an object of the present invention to provide circuit arrangements for supplying an automatic gain control voltage to a transistor signal amplifying circuit or circuits of a radio or television receiver incorporating both tubes and transistors.

According to a further aspect of the invention, therefore, the automatic gain control voltage for the transistor signal amplifying circuit or circuits is derived from a load connected in series with the anode or the cathode of a tube signal amplifier stage whose gain is itself controlled by means of an automatic gain control voltage.

The transistor circuit or circuits to which the automatic gain control voltage is to be applied derive their power supply from a load connected in series with one of the tubes of the receiver in the manner herein described. Thus the power supply to the transistor circuit may be derived from an intermediate frequency tube amplifier stage of the receiver which does not have an automatic gain control voltage applied to it, and the automatic gain control voltage for the transistor circuit or circuits may be derived from an intermediate frequency tube amplifier stage which does have an automatic gain control voltage applied to it.

According to a feature of this aspect of the invention, means may be provided for applying a delayed automatic gain control voltage to the transistor circuit or circuits, the desired delay being obtained by means of a diode.

Figure 1:
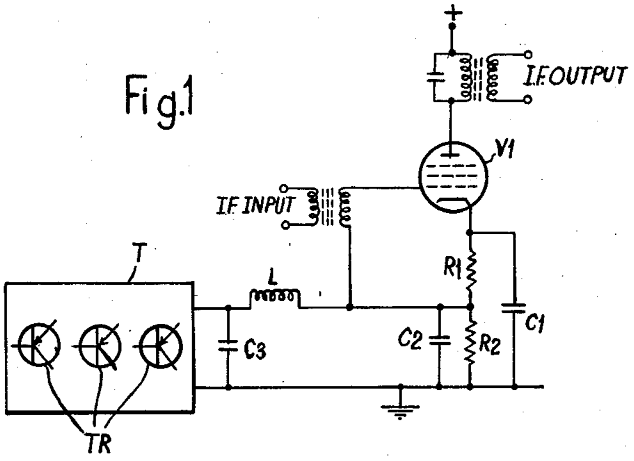
Figure 2:
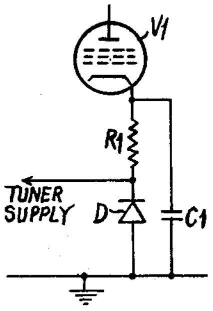
Figure 3:
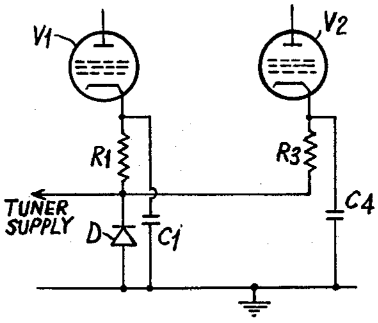
Figure 4:
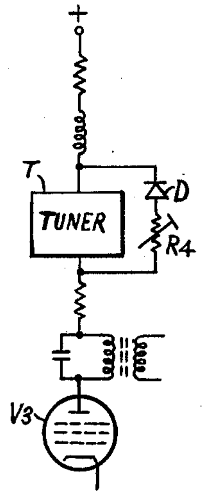
Figure 5:
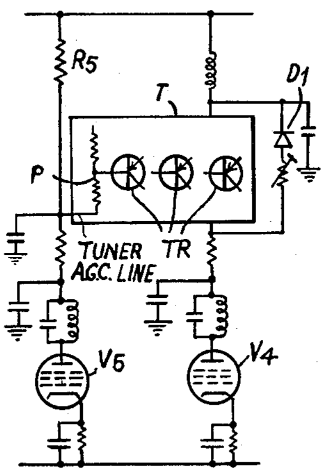
Figure 6:
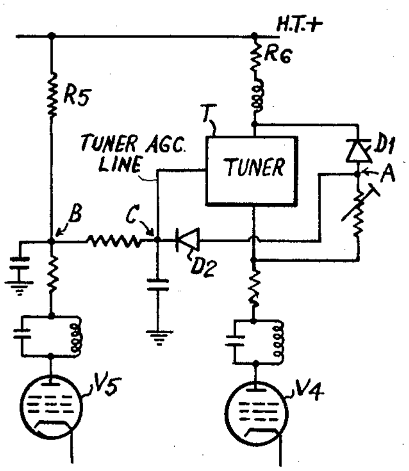
Figure 7:
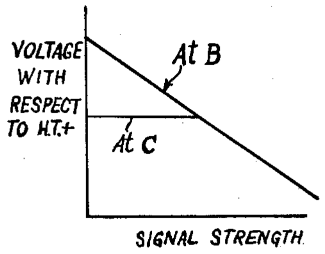
Figure 8:
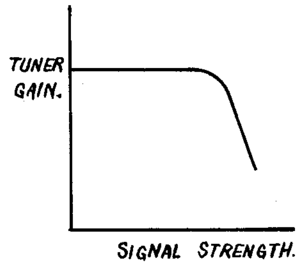
Figure 9:
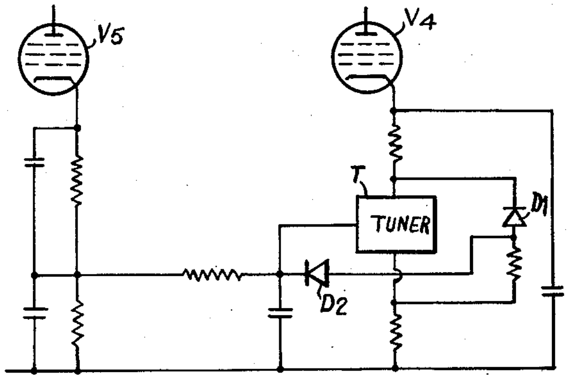

In order that the invention may be more fully understood reference will now be made to the accompanying drawings, in which:

FIGURE 1 is a circuit diagram of part of a television receiver incorporating a power supply arrangement according to the present invention, FIGURES 2, 3 and 4 show further power supply arrangements, FIGURE 5 is a circuit diagram of part of a television receiver incorporating an automatic gain control circuit according to the present invention, FIGURE 6 shows a further automatic gain control circuit arrangement, FIGURES 7 and 8 are explanatory graphs, and FIGURE 9 shows yet another automatic gain control circuit arrangement.

Referring to FIGURE 1, the tube V1 comprises an intermediate frequency amplifier stage of a television receiver and has two resistors R1 and R2 connected in series with its cathode circuit. C1 is a cathode decoupling condenser. The resistor R1 is dimensioned to provide the correct grid bias for the tube V1, which does not have an automatic gain control voltage applied to it, and the resistor R2 is dimensioned to provide the correct voltage and current required by the tuner unit T of the receiver connected across this resistor. This tuner, which employs transistors TR in its circuitry, may comprise an RF amplifier stage, a mixer stage and a local oscillator stage and may, for example, be constructed generally in the manner described in our copending application No. 129,432, now Patent No. 3,181,068. The tuner may require a power supply of approximately 8 milliamps at 10 volts and employ PNP transistors. The sub-chassis on which the tuner is built and to which the emitter circuits of the transistors are taken is connected to the positive end of the resistor R2 through filter circuit L, C2, C3, whilst the collector circuits of the transistors are connected to the chassis potential of the main receiver which constitutes the negative terminal of the supply to the transistors.

FIGURE 2 shows a modification of the embodiment of FIGURE 1 wherein the resistor R2 is replaced by a zener diode D having an appropriate characteristic to provide a stabilised power supply. In order to provide a greater current to bias the zener diode well over the knee of its characteristic, it may be connected in series with the cathode circuit of two tubes as shown in FIGURE 3. In this embodiment both tubes V1 and V2 may comprise intermediate frequency amplifier stages. V2 has a cathode bias resistor R3 which is decoupled by condenser C4.

A small padder resistor may be included in series with the zener diode to compensate for manufacturing spreads in the zener voltage. Such an arrangement is shown in the embodiment of FIGURE 4 where the tuner T is supplied from a zener diode D connected in series with the anode of an intermediate frequency amplifier tube V4. The padder resistor is shown at R4.

Referring now to FIGURE 5, which shows an automatic gain control circuit according to this invention, tube V4 constitutes an intermediate frequency amplifier stage of a television receiver which does not have an automatic gain control voltage applied to it and tube V5 also constitutes an intermediate frequency amplifier stage but this latter stage does have an automatic gain control voltage applied to it. The receiver includes a tuner unit T which employs transistors TR in its circuitry and which may comprises an RF amplifier stage, a mixer stage and a local oscillator stage and may for example be constructed generally in the manner described in our aforementioned copending application No. 129,432. The power supply for the tuner is derived from a load comprising a zener diode D1 connected in series with the anode of the tube V4 in the manner hereinbefore described. In order to provide an automatic gain control voltage for the transistor radio frequency amplifier in the tuner T, a resistor R5 is connected in series with the anode circuit of the tube V5 and its magnitude is such that when the tube is drawing maximum current, i.e. when no automatic gain control voltage is applied to this tube, the voltage drop across the resistor is equal to the voltage of the power supply to the tuner. As an automatic gain control voltage is applied to the tube V5 its anode current falls and so also does the voltage drop across the resistor R5. The voltage across this resistor is applied as an A.G.C. bias to the transistor of the RF amplifier stage in the tuner. This bias may be applied to one end of a potential divider P to an intermediate point on which the base of the transistor is connected, the other end of the divider being connected to one of the terminals of the power supply. The exact connection will depend in practice upon the polarity of the automatic gain control voltage applied to the tuner and the type of transistor which is being used, i.e. PNP or NPN.

The circuit arrangement of FIGURE 5 enables a simple automatic gain control voltage to be applied to the transistor RF amplifier stage of the tuner. It is however possible to derive a delayed automatic gain control voltage for the RF stage of the tuner from an intermediate frequency tube amplifier stage to which a simple non-delayed automatic gain control voltage is applied. One such circuit is shown in FIGURE 6 which employs the property of a diode acting as a low impedance when it is forward biased and as a high impedance when it is reverse biased. In FIGURE 6 tubes V4 and V5 correspond to those in FIGURE 5 and the power supply to the tuner is derived from across the zener diode D1 connected in series with the anode of the tube V4. The further diode D2 provides the required delay for the automatic gain control voltage applied to the transistor RF amplifier stage of the tuner T.

Taking the high tension positive line as a reference the voltage at point A, at the anode of diode D1, is the voltage across the zener diode together with the small voltage drop across the resistor R6 and since the current through the intermediate frequency amplifier stage V4 is not controlled by an automatic gain control voltage the voltage at A remains constant. A simple automatic gain control voltage is applied to the other intermediate frequency amplifier stage V5 controlling the current through that stage. The voltage at point B, i.e. that across resistor R5, is therefore dependent on the amount of automatic gain control voltage applied to this stage, as described in the embodiment of FIGURE 5. When the receiver is operating at maximum gain the voltage at the point B is greater than that at point A, remembering that both are referred to the high tension positive line, and under these conditions the diode D2 is forward conducting and presents a low impedance. As a result the voltage at point C, i.e. the cathode of diode D2 and A.G.C. input to the tuner, is substantially equal to that at A. As an increasing amount of automatic gain control voltage is applied to the intermediate frequency amplifier stage V5, the current through that stage falls and the potential drop across the resistor R1 becomes smaller until eventually the voltage at B is less than that at point A. When this happens the diode D2 becomes nonconducting and presents a high impedance, isolating the point C from the point A and allowing the automatic gain control voltage to be applied to the transistor RF amplifier stage of the tuner. The characteristics of the automatic gain control circuit are shown in FIGURES 7 and 8.

A circuit arrangement operating on similar principles may be incorporated in the cathode circuits of the two tubes V4 and V5 instead of in the anodes and such an arrangement is shown in FIGURE 9.

Whilst particular embodiments have been described it will be understood that various modifications may be made without departing from the scope of this invention. Thus the invention can also be employed for transistor circuits incorporating NPN transistors with appropriate changes in the polarity of the power supply as applied to the transistors and in the bias arrangement for applying the automatic gain control voltage to the transistor circuits. Moreover instead of applying the automatic gain control voltage directly to bias an electrode of a transistor it may be employed to bias a damping diode connected across a tuned circuit of a transistor signal amplifier stage whose gain is to be controlled.

I claim:

1. In a receiver incorporating both electronic tubes and transistors, a first intermediate frequency tube signal amplifier stage without automatic gain control applied to it, a second intermediate frequency tube signal amplifier stage, means for applying an automatic gain control voltage to said second intermediate frequency amplifier stage, at least one transistor radio frequency signal amplifier stage feeding said intermediate frequency amplifier stages, a load connected in series with said first intermediate frequency amplifier stage, means for deriving the power supply for said at least one transistor radio frequency amplifier stage from across said load and for feeding said power supply to said at least one transistor radio frequency amplifier stage, a further load connected in series with said second intermediate frequency amplifier stage, and means for deriving an automatic gain control voltage for said at least one transistor radio frequency signal amplifier stage from across said further load in said second intermediate frequency amplifier stage and for feeding said automatic gain control voltage to said at least one transistor radio frequency amplifier stage.

2. A receiver as claimed in claim 1, including means for producing a delayed automatic gain control voltage to be applied to said at least one transistor radio frequency signal amplifier stage.

3. A receiver as claimed in claim 1, in which said load in series with said first intermediate frequency amplifier stage comprises a zener diode whereby a stabilised power supply is produced for said at least one transistor stage.

References Cited by the Examiner

UNITED STATES PATENTS

| | | | |
|---|---|---|---|
| 2,719,915 | 10/1955 | Van Weel | 325—399 |
| 2,837,635 | 6/1958 | Epperson | 325—399 |
| 3,056,891 | 10/1962 | Kabell | 307—88.5 |
| 3,090,919 | 5/1963 | Tateishi | 325—492 XR |
| 3,104,357 | 9/1963 | Birkenes | 325—400 XR |

OTHER REFERENCES

Stoner, D. L.: Do It With Diodes, in Radio Electronics, pp. 38–40, February 1961.

ROBERT H. ROSE, *Primary Examiner.*

DAVID G. REDINBAUGH, *Examiner.*